(12) United States Patent
Du

(10) Patent No.: US 10,516,877 B2
(45) Date of Patent: Dec. 24, 2019

(54) LIGHT FIELD COLLECTION CONTROL METHODS AND APPARATUSES, LIGHT FIELD COLLECTION DEVICES

(71) Applicant: BEIJING ZHIGU RUI TUO TECH CO., LTD., Beijing (CN)

(72) Inventor: Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 52 days.

(21) Appl. No.: 15/537,494

(22) PCT Filed: Nov. 20, 2015

(86) PCT No.: PCT/CN2015/095113
§ 371 (c)(1),
(2) Date: Jun. 19, 2017

(87) PCT Pub. No.: WO2016/101742
PCT Pub. Date: Jun. 30, 2016

(65) Prior Publication Data
US 2017/0366804 A1 Dec. 21, 2017

(30) Foreign Application Priority Data
Dec. 25, 2014 (CN) .......................... 2014 1 0829721

(51) Int. Cl.
*H04N 13/296* (2018.01)
*H04N 5/225* (2006.01)
(Continued)

(52) U.S. Cl.
CPC ........... *H04N 13/296* (2018.05); *G06T 7/521* (2017.01); *H04N 5/2254* (2013.01);
(Continued)

(58) Field of Classification Search
CPC .................................................. H04N 13/296
See application file for complete search history.

(56) References Cited

U.S. PATENT DOCUMENTS

2013/0250159 A1* 9/2013 Nagasaka ............ H04N 5/2254
348/340
2014/0016827 A1* 1/2014 Yamamoto .............. G06T 5/003
382/106

FOREIGN PATENT DOCUMENTS

CN 102739945 A 10/2012
CN 103327223 A 9/2013
(Continued)

OTHER PUBLICATIONS

International Search Report and Written Opinion for Application No. PCT/CN2015/095113, dated Feb. 18, 2016, 9 pages.
(Continued)

*Primary Examiner* — Jefferey F Harold
*Assistant Examiner* — Justin B Sanders
(74) *Attorney, Agent, or Firm* — Sheppard Mullin Richter & Hampton LLP

(57) ABSTRACT

Embodiments of the present application disclose light field collection control methods and apparatuses and light field collection devices, wherein one light field collection control method comprises: acquiring an aperture parameter of a main lens of a light field camera; determining, according to the main lens aperture parameter, in an image sensor of the light field camera, a local part of an imaging region corresponding to at least one sub-lens in a sub-lens array of the light field camera as a first imaging region; adjusting pixel density distribution of the image sensor, to cause pixel density of the first imaging region after adjustment to be distinguished from that of other parts of the imaging region; and performing light field collection on a scene via the adjusted light field camera. The embodiments of the present (Continued)

application may improve utilization of image sensor pixels in a process of performing light field collection on a scene based on a light field camera, and improve imaging quality of light field images.

18 Claims, 6 Drawing Sheets

(51) Int. Cl.
    H04N 5/232      (2006.01)
    G06T 7/521      (2017.01)
    H04N 13/204     (2018.01)
    H04N 5/351      (2011.01)
(52) U.S. Cl.
    CPC ..... *H04N 5/23212* (2013.01); *H04N 5/23235* (2013.01); *H04N 5/351* (2013.01); *H04N 13/204* (2018.05)

(56) References Cited

FOREIGN PATENT DOCUMENTS

| | | |
|---|---|---|
| CN | 104243823 A | 12/2014 |
| CN | 104506762 A | 4/2015 |
| JP | 2006-129411 A | 5/2006 |

OTHER PUBLICATIONS

Bishop et al., "Light Field Superresolution," ICCP, 2009, 9 pages.
Georgeiv et al., "Spatio-Angular Resolution Tradeoff in Integral Photography," Eurographics Symposium on Rendering, 2006, 10 pages.
Ng et al., "Light Field Photography with a Hand-held Plenoptic Camera," Stanford Computer Science Technical Report, Jan. 2005, 11 pages.

\* cited by examiner

LIGHT FIELD COLLECTION CONTROL METHODS AND APPARATUSES, LIGHT FIELD COLLECTION DEVICES

CROSS-REFERENCE TO RELATED APPLICATIONS

This application is a National Phase Application of International Application No. PCT/CN2015/095113, filed on Nov. 20, 2015, which claims priority to and benefit of Chinese Patent Application No. 201410829721.3, filed on Dec. 25, 2014, and entitled "Light Field Collection Control Methods and Apparatuses and Light Field Collection Devices", each of which is herein incorporated by reference in its entirety.

TECHNICAL FIELD

The present application generally relates to the field of light field collection technologies, and in particular, to light field collection control methods and apparatuses and light field collection devices.

BACKGROUND

A light field camera embodies imaging technology that uses a sub-lens array to record and reproduce a three-dimensional scene, which usually places a sub-lens array between a main lens and an image sensor such as CCD, and records, through the sub-lens array, light field information of different directions of a three-dimensional scene on a focal plane of the sub-lens array.

Different from the two-dimensional image collection manner of the traditional camera, the light field camera can record space, view angle and other four-dimensional light field information of a three-dimensional scene through single exposure, and support "first shoot and then focus" (i.e., focusing is not required during shooting). It can generate rich image effects by processing shot images, and is suitable for various imaging applications, for example, digital re-focusing, change of view angle, depth images, three-dimensional reconstruction, all-in-focus images and the like.

However, although the light field camera increases the flexibility of single exposure imaging, the light field camera records view angle information of light of objects by comprising spatial resolution of images, in a process of light field collection on a scene based on a light field camera, image sensor pixels of an image sensor of the light field camera configured to perform light field collection are limited, some image sensor pixels do not participate in the light field collection, and utilization of the image sensor pixels may be low, which affects imaging quality of light field images.

SUMMARY

A brief summary about the present application is given hereinafter, so as to provide a basic understanding about certain aspects of the present application. It should be understood that the summary is not an exhaustive listing about the present application. It is neither intended to identify essential or important parts of the present application, nor intended to limit the scope of the present application. Its purpose is merely to present some concepts, as the preamble of the following detailed description.

The present application provides various light field collection control methods and apparatuses and various image collection devices.

In one aspect, embodiments of the present application provide a light field collection control method, comprising:
acquiring an aperture parameter of a main lens of a light field camera;
determining, according to the main lens aperture parameter, in an image sensor of the light field camera, a local part of an imaging region corresponding to at least one sub-lens in a sub-lens array of the light field camera as a first imaging region;
adjusting pixel density distribution of the image sensor, to cause pixel density of the first imaging region after adjustment to be distinguished from that of other parts of the imaging region; and
performing light field collection on a scene via the adjusted light field camera.

In another aspect, the embodiments of the present application further provide a light field collection control apparatus, comprising:
a main lens aperture parameter acquisition module, configured to acquire an aperture parameter of a main lens of a light field camera;
a first imaging region determination module, configured to determine, according to the main lens aperture parameter, in an image sensor of the light field camera, a local part of an imaging region corresponding to at least one sub-lens in a sub-lens array of the light field camera as a first imaging region;
a pixel density distribution adjustment module, configured to adjust pixel density distribution of the image sensor, to cause pixel density of the first imaging region after adjustment to be distinguished from that of other parts of the imaging region; and
a light field collection control module, configured to perform light field collection on a scene via the adjusted light field camera.

In a further aspect, the embodiments of the present application provide a light field collection device, comprising a light field camera and the light field collection control apparatus as discussed above, the light field collection control apparatus being connected with the light field camera.

The technical solution according to the embodiments of the present application determines, according to an aperture parameter of a main lens of a light field camera, in an image sensor of the light field camera, a local part of an imaging region corresponding to at least one sub-lens in a sub-lens array of the light field camera as a first imaging region, adjusts pixel density distribution of the image sensor, to cause pixel density of the first imaging region after adjustment to be distinguished from that of other parts of the imaging region, and performs light field collection on a scene via the adjusted light field camera, to cause pixel density of an image sensor of an effective imaging region corresponding to the aperture parameter of the main lens to be higher, thereby improving utilization of image sensor pixels in a process of performing light field collection on a scene based on a light field camera and improving imaging quality of light field images.

These and other advantages of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components, wherever possible. The drawings together with the following detailed description are included in the specification and form a part of the specification, and are configured to further exemplify alternative embodiments of the present application and explain the principle and advantages of the present application. In the drawings.

Figure 1:
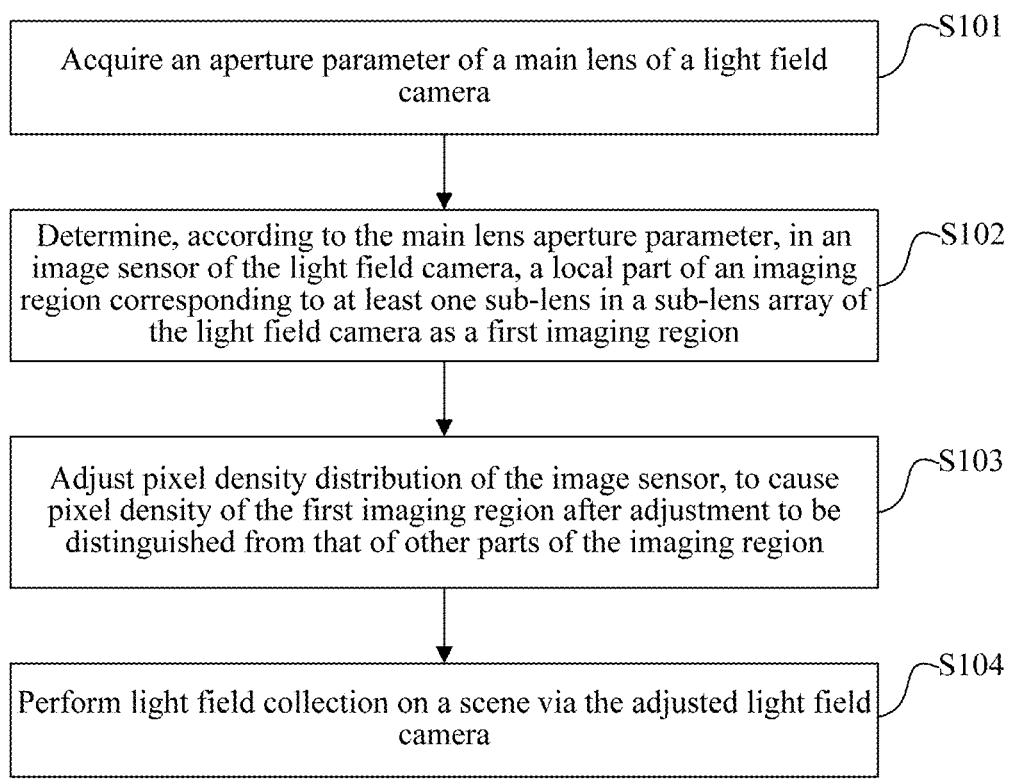
FIG. 1 is a flowchart of a light field collection control method according to one embodiment of the present application.

Those skilled in the art would understand that, elements in the drawings are merely illustrated for the sake of simplicity and clarity, and may not be drawn to scale. For example, sizes of certain elements in the drawings may be amplified relative to other elements, so as to help to improve the understanding about the embodiments of the present application.

DETAILED DESCRIPTION

Exemplary embodiments of the present application are described below in detail with reference to the accompanying drawings. For the sake of clarity and simplicity, not all the features of actual embodiments are described in the specification. However, it should be understood that, many decisions specific to implementations must be made during development of any such actual embodiment, so as to achieve specific goals of developers, for example, constraints related to systems and services are met, and the constraints may vary with different implementations. In addition, it should also be understood that, although actually development may be complicated and time-consuming, those skilled in the art will likely benefit from this disclosure in actual implementation.

Herein, it should also be noted that, in order to facilitate understanding of the present application, apparatus structures and/or processing steps closely related to solutions according to the present application are described in detail in the accompanying drawings and the specification. Representation and description about certain components and processes known to those of ordinary skill in the art are omitted.

Specific implementations of the present application are described in detail hereinafter with reference to the accompanying drawings and embodiments (in which the same elements are denoted by the same reference numerals). The following embodiments are intended to describe the present application, but not to limit the scope of the present application.

It should be understood by those skilled in the art that the terms such as "first" and "second" in the present application are merely intended to distinguish different steps, devices or modules, etc., which neither represent any particular technical meaning nor indicate a necessary logical sequence between them.

FIG. 1 is a flowchart of a light field collection control method according to one embodiment of the present application. An execution body of the light field collection control method according to the embodiment of the present application may be a certain light field collection control apparatus, and the light field collection control apparatus may perform static or dynamic light field collection control by executing the light field collection control method during applications such as phototaking, filming, photographing and video monitoring. Device manifestations of the light field collection control apparatus may vary, for example, the light field collection control apparatus may be a certain separate component, and the component cooperates with the light field camera through communications; or the light field collection control apparatus may be integrated, as a certain functional module, into an image collection device comprising a light field camera, and the image collection device may include, but is not limited to, a camera, a video camera, a mobile phone and the like, which is not limited by the embodiments of the present application. Specifically, as shown in FIG. 1, a light field collection control method according to the embodiment of the present application comprises:

S101: Acquire an aperture parameter of a main lens of a light field camera.

A light field camera generally comprises a main lens, a sub-lens array and an image sensor disposed in sequence, and the sub-lens array comprises multiple array-distributed sub-lenses. The scene to be shot is a three-dimensional scene. Light rays in different directions from different object points of the scene converge onto at least one sub-lens of the sub-lens array via the main lens, the light rays converged by the main lens are separated via the at least one sub-lens, the separated light rays record light intensity, direction and other information through the image sensor, thus acquiring imaging information (i.e., light field information) of multiple viewing directions of the scene, and the acquired light field information can manifest as multiple parallax images interleaved, which might as well be called light field images. An aperture parameter configured to describe the main lens of the light field camera might as well be called main lens aperture parameter, and the main lens aperture parameters may include, but not limited to, one or more parameters such as main lens aperture size and main lens aperture radius.

S102: Determine, according to the main lens aperture parameter, in an image sensor of the light field camera, a local part of an imaging region corresponding to at least one sub-lens in a sub-lens array of the light field camera as a first imaging region.

In the light field camera, sub-lens distribution of the sub-lens array and imaging regions of the image sensor may have a certain predetermined corresponding relationship therebetween, an imaging region of the image sensor corresponding to the at least one sub-lens may be determined according to the corresponding relationship, for example, in the sub-lens array, one sub-lens corresponds to one imaging region, and each imaging region comprises multiple image sensor pixels. If apertures of the main lens are different, regions that participate in light field collection in an imaging region corresponding to one sub-lens are not the same. In actual applications, it is feasible to determine, according to the main lens aperture parameter, in one or more sub-lenses, a local part of an effective imaging region corresponding to each sub-lens as a first imaging region.

S103: Adjust pixel density distribution of the image sensor, to cause pixel density of the first imaging region after adjustment to be distinguished from that of other parts of the imaging region.

The image sensor in an embodiment of the present application may be an image sensor with adjustable pixel density. For example, the image sensor with adjustable pixel density may comprise a flexible image sensor, and the flexible image sensor comprises a flexible substrate and multiple image sensor pixels formed on the flexible substrate, wherein the flexible substrate, under certain conditions, may adjust pixel density distribution thereof through expansion, contraction, bending or other changes. For another example, the image sensor with adjustable pixel density may comprise multiple image sensor pixels array-distributed and a controlled deformable material portion, wherein the controlled deformable material portion is connected with multiple image sensor pixels respectively; the controlled deformable material portion may deform under a force of an external field, and density distribution of the multiple image sensor pixels is correspondingly adjusted through the deformation; and the external field is controlled by the light field collection control apparatus. Deformation of the controlled deformable material portion may be performed by changing a certain external effect factor (such as an external field) on the controlled deformable material portion, and when the external field thereon is removed or changed, the deformation of the controlled deformable material portion can be restored; the controlled deformable material portion may be made from one or more of controlled deformable materials such as piezoelectric materials, electroactive polymers, photodeformation materials and magnetostriction materials. Depending on different controlled deformable materials included in the controlled deformable material portion, it can be determined which corresponding external fields may be used to control controlled deformable material portion, for example, the external field may be, but is not limited to, an electric field, a magnetic field, a light field and the like.

In light of the characteristic that the pixel density distribution of the image sensor is adjustable, an embodiment of the present application adjust pixel density distribution of the image sensor, to cause, in one imaging region of the image sensor corresponding to one sub-lens (or each imaging region of multiple imaging regions corresponding to multiple sub-lenses), pixel density of a first imaging region (in the event of uneven distribution, the pixel density in an embodiment of the present application may refer to average pixel density) to be distinguished from that of other parts of the imaging region (which might as well be called second imaging region). That is to say, an imaging region corresponding to a sub-lens comprises a first imaging region and a second imaging region, and average pixel density of the first imaging region is distinguished from or different from pixel density of the second imaging region. The "distinguished from" in the embodiments of the present application means "different from", and could be "greater than" or "less than", that is to say, for an imaging region corresponding to one sub-lens, a first imaging region determined may be an effective part, which participates in light field collection, in an imaging region corresponding to a sub-lens, and in this case, it is feasible to cause average pixel density of the first imaging region to be greater than average pixel density of the second imaging region by adjusting pixel density distribution of the image sensor; or, for an imaging region corresponding to one sub-lens, a first imaging region determined may be imaging regions of other parts, which do not participate in light field collection, in an imaging region corresponding to a sub-lens, and in this case, it is feasible to cause average pixel density of the first imaging region to be less than average pixel density of the second imaging region by adjusting pixel density distribution of the image sensor.

S104: Perform light field collection on a scene via the adjusted light field camera.

Apertures will affect the number of effective image sensor pixels of an image sensor which actually perform light field collection, for example, in the event of keeping pixels of the image sensor unchanged, if apertures are decreased, the number of effective image sensor pixels of the image sensor which actually perform light field collection will be reduced correspondingly, thus affecting utilization of image sensor pixels of the light field camera. Due to reasons such as limitations of the conventional structure of the light field camera, in a process of performing light field collection on a scene based on the light field camera, the number of effective image sensor pixels which participate in light field collection is limited. In order to avoid further reducing utilization of the image sensor pixels due to adjustment of the apertures, the technical solution according to an embodiment of the present application determines, according to an aperture parameter of a main lens of a light field camera, in an image sensor of the light field camera, a local part of an imaging region corresponding to at least one sub-lens in a sub-lens array of the light field camera as a first imaging region, adjusts pixel density distribution of the image sensor, to cause pixel density of the first imaging region after adjustment to be distinguished from that of other parts of the imaging region, and performs light field collection on a scene via the adjusted light field camera, to cause pixel density of an image sensor of an effective imaging region corresponding to the aperture parameter of the main lens to be higher, thereby improving utilization of image sensor pixels in a process of performing light field collection on the scene based on the light field camera and improving imaging quality of light field images.

In the technical solution according to an embodiment of the present application, optionally, before acquiring an aperture parameter of a main lens, the light field collection control method further comprises: adjusting the aperture parameter of the main lens. As utilization of image sensor pixels of the light field camera is lower than the traditional non-light-field camera, in order to avoid further reducing effective image sensor pixels which participate in light field collection due to adjustment of the apertures, such as decreasing the apertures for light field collection in a strong light environment, the aperture of the light field camera may be set as a constant aperture that is nonadjustable, in a process of performing light field collection based on the light field camera of this structure, even if illumination of the scene is very strong, a user cannot reduce incoming light by decreasing aperture, but instead a user may reduce light in other ways such as adding a density filter, thus wasting effective lighting information; in addition, technologies that support replacement of lenses with different apertures cannot be used in light field cameras with nonadjustable apertures, which limits applications of the light field camera to some extent and brings about inconvenience to users. The technical solution according to the embodiments of the present application provides a solution for balancing effective image sensor utilization and adjustable aperture, thus broadens application scope of light field cameras, and improves convenience to users.

Figures 2A, 2B, 2C:
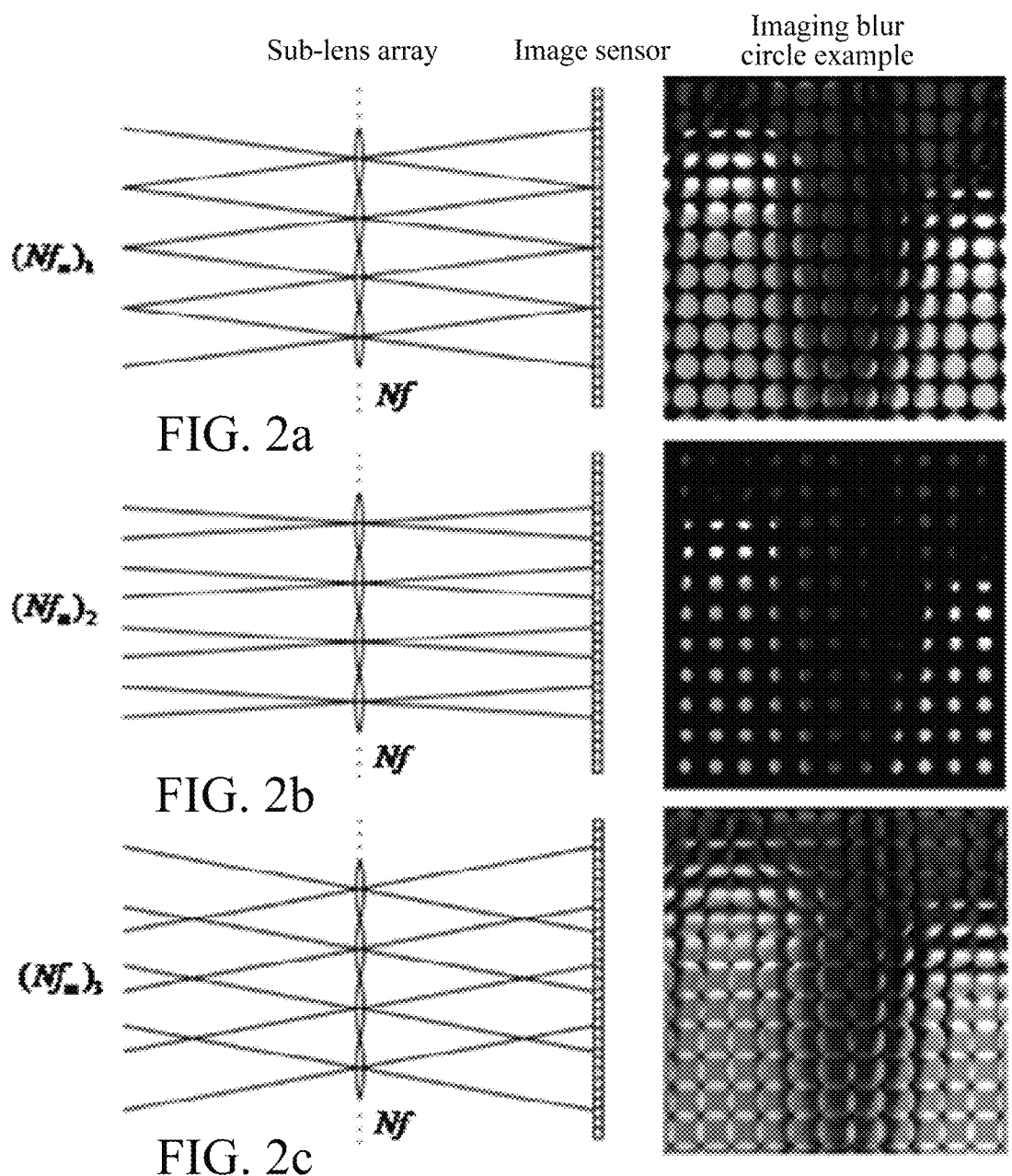
FIG. 2a is a first optional example of a corresponding relationship between a main lens aperture parameter, a sub-lens aperture parameter and an imaging circle of confusion according to one embodiment of the present application.
FIG. 2b is a second optional example of a corresponding relationship between a main lens aperture parameter, a sub-lens aperture parameter and an imaging circle of confusion according to one embodiment of the present application.
FIG. 2c is a third optional example of a corresponding relationship between a main lens aperture parameter, a sub-lens aperture parameter and an imaging circle of confusion according to one embodiment of the present application.

Optionally, the adjusting the aperture parameter of the main lens comprises: determining a main lens aperture parameter adjustment range according to sub-lens aperture parameters of the light field camera; and adjusting the aperture parameter of the main lens according to the main lens aperture parameter adjustment range. An aperture parameter configured to describe a sub-lens in a sub-lens array of the light field camera might as well be called sub-lens aperture parameter, and the sub-lens aperture parameter may include, but not limited to, one or more parameters such as sub-lens aperture size and sub-lens aperture radius. The inventor of the present application has found in research that, an application of performing light field collection of a scene based on a light field camera records brightness, viewing angle and other light field information of a certain object point of the scene through multiple image sensor pixel points of the image sensor. In order to reduce computing complexity of post-processing (such as acquiring a re-focusing image) based on a light field image, in the process of light field collection, it may be helpful to try to avoid or reduce the possibility that the same image sensor pixel point records light field information of different object points of the scene, while an imaging size (usually represented with a circle of confusion) of the light field information of the scene in an imaging region of the image sensor has a certain corresponding relationship with the main lens aperture parameter and the sub-lens aperture parameter respectively. For example, in the optical scenes shown in FIG. 2a-FIG. 2c, the image sensor in the light field camera is disposed on a focal plane of the sub-lens array. The main lens aperture parameter $Nf_m$ is adjusted, to cause an adjusted main lens aperture $(Nf_m)_1$ to be equal to a sub-lens aperture Nf; as shown in FIG. 2a, in this case, an imaging circle of confusion of an object point of an imaging region of the image sensor is greater, and adjacent imaging circles of confusion are at a smaller interval. The main lens aperture parameter $Nf_m$ is adjusted continuously, to cause an adjusted main lens aperture $(Nf_m)_2$ to be less than the sub-lens aperture Nf; as shown in FIG. 2b, in this case, an imaging circle of confusion of the object point of the imaging region of the image sensor is decreased, and an interval between adjacent imaging circles of confusion is increased. The main lens aperture parameter $Nf_m$ is adjusted continuously, to cause an adjusted main lens aperture $(Nf_m)_3$ to be greater than the sub-lens aperture Nf; as shown in FIG. 2c, in this case, an imaging circle of confusion of the object point of the imaging region of the image sensor is increased, but adjacent imaging circles of confusion at least partially overlap, and the overlapping circle of confusion portion is equivalent to that the same sensor pixel point records light field information of different object points. Thus, this embodiment of the present application can determine a main lens aperture parameter adjustment range according to the sub-lens aperture parameter, for example, the main lens aperture parameter adjustment range is (0, Nf), and the solution is adopted to adjust the aperture of the main lens, which helps to avoid or reduce the probability that the same image sensor pixel point records light field information of different object points of the scene possibly caused by adjustment of pixel density of the image sensor, thereby reducing computing complexity of post-processing based on the light field image.

Figure 3:
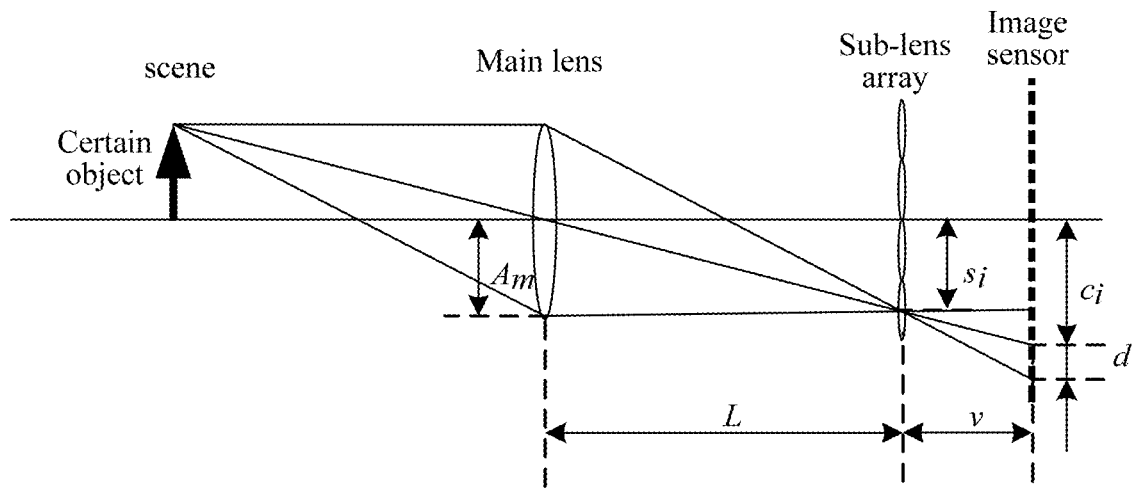
FIG. 3 is an example of one optional light path of light field collection according to one embodiment of the present application.

Optionally, the determining a first imaging region in an imaging region corresponding to any sub-lens comprises: acquiring a first distance between the main lens and the sub-lens array and a second distance between the sub-lens array and the image sensor; determining imaging region circle of confusion information according to the aperture parameter of the main lens, the first distance and the second distance; and determining a local part corresponding to the imaging region circle of confusion information in the imaging region corresponding to the at least one sub-lens as the first imaging region. One optional light path of the light field camera is as shown in FIG. 3, the image sensor may be located in a focal plane of the sub-lens array, the sub-lens array may be located on an imaging plane of the main lens, and it can be known according to the geometrical optics imaging principle that a main lens aperture radius and an imaging circle of confusion radius of an imaging region have the following relationship:

$$\frac{A_m}{d} = \frac{L}{v} \qquad (1)$$

where $A_m$ denotes the main lens aperture radius, d denotes the circle of confusion radius, L denotes the first distance between the main lens and the sub-lens array, and v denotes the second distance between the sub-lens array and the image sensor; a distance from the center of the circle of confusion to the center of the image sensor can be determined according to the following formula:

$$C_i = \frac{L+v}{L} s_i \qquad (2)$$

where $C_i$ denotes a distance from a circle of confusion on an imaging region corresponding to a certain sub-lens to the center of the image sensor, and $S_i$ denotes a distance from the sub-lens to the center of the image sensor. The size of the circle of confusion radius and the position of the center of the circle of confusion can be determined according to the formulas (1) and (2) respectively, and in an imaging region, a part corresponding to the corresponding circle of confusion is determined as the first imaging region. It is feasible to use the solution to determine a first imaging region of an imaging region corresponding to one sub-lens in the sub-lens array, or determine a first imaging region of each imaging region in various imaging regions corresponding to the sub-lenses in the sub-lens array, or determine a first imaging region of each imaging region in various imaging regions corresponding to some sub-lenses in the sub-lens array, and so on; the implementation is simple and flexible.

Figure 4:
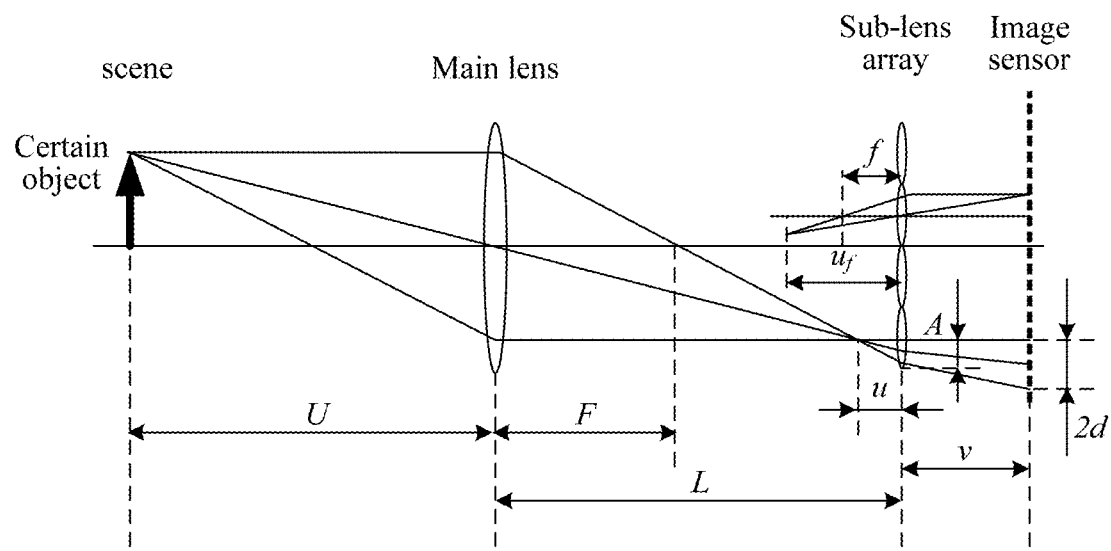
FIG. 4 is an example of another optional light path of light field collection according to one embodiment of the present application.

Optionally, the light field collection control method may further comprise: determining a re-focusing capability range of the light field camera according to the aperture parameter of the main lens. One optional light path of the light field camera is as shown in FIG. 4, and it is assumed that a circle of confusion radius of imaging, in the image sensor, of an object at a certain depth of the scene meets the following formula:

$$\pm d = \frac{A f u_f}{u_f - f} \left( \frac{1}{u_f} - \frac{1}{u} \right) \quad (3)$$

in the formula, d denotes an absolute value of a circle of confusion radius of imaging, in the image sensor, of a object at a certain depth of the scene, wherein if an imaging position of the object via the main lens is located in the rear of the focal plane of the main lens, the circle of confusion radius is represented with +d; if the imaging position of the object via the main lens is located on the focal plane of the main lens, d=0, and if the imaging position of the object via the main lens is located in the front of the focal plane of the main lens, the circle of confusion radius is represented with −d. A is the sub-lens aperture radius, f is the focal length of the sub-lens, $u_f$ is a distance from the focusing plane of the sub-lens to the center of the sub-lens, and U is a distance from a real image or virtual image to the center of the sub-lens (the real image is a positive value, while the virtual image is a negative value).

The formula of imaging of the main lens is:

$$\frac{1}{F} = \frac{1}{U} + \frac{1}{V} = \frac{1}{U} + \frac{1}{L-u} \quad (4)$$

where U is an object distance from an actual object of the scene to the main lens, that is, a distance from a plane (re-focusing plane) where a re-focusing point of a certain re-focusing image that can be acquired based on a light field image to the main lens; F is the focal length of the main lens, and L denotes a first distance between the main lens and the sub-lens array.

The formula of imaging of the sub-lens:

$$\frac{1}{f} = \frac{1}{u_f} + \frac{1}{v} \quad (5)$$

where v denotes a second distance between the sub-lens array and the image sensor.

According to the formulas (3), (4) and (5), it can be obtained:

$$\frac{1}{U} = \frac{1}{F} + \frac{1}{\frac{1}{\frac{1}{f} - \frac{1}{v}\left(1 \pm \frac{d}{A}\right)} - L} \quad (6)$$

In combination with the formulas (1) and (6), it can be obtained:

$$\frac{1}{U} = \frac{1}{F} + \frac{1}{\frac{1}{\frac{1}{f} - \frac{1}{v} \pm \frac{A_m}{AL}} - L} \quad (7)$$

According to the formula (7), two U values can be obtained through computing, written as $U_{min}$ and $U_{max}$, a range between $U_{min}$ and $U_{max}$ indicates a re-focusing capability range of the light field camera, the re-focusing capability range may comprise one re-focusing point or multiple re-focusing points discretely distributed, and any re-focusing point serves as a focusing point of a re-focusing image acquired based on a light field image. This solution can help acquire a re-focusing capability range of the light field camera corresponding to the current main lens aperture parameter of the light field camera, and the solution is simple and easy to implement.

After the re-focusing capability range is acquired, the re-focusing capability range can be displayed, to improve convenience to users. The manner of displaying the re-focusing capability range can be determined according to actual needs, and the implementation is very flexible, for example, it is feasible to acquire distribution information of the pixel points of a preview image of the scene in a depth direction; and display a corresponding relationship between the distribution information and the re-focusing capability range. In an application scene of performing light field collection on a scene based on a light field camera, a preview image at a certain view angle can be presented on a display screen of the light field camera, the preview image seen by the user directly from the display screen is a clear two-dimensional image, based on this, the technical solution according to an embodiment of the present application can also acquire distribution information of the pixel points of the preview image in a depth direction, determine a corresponding relationship between the distribution information and the re-focusing capability range, and display the corresponding relationship. For example, distribution information of pixel points of a preview image in a depth direction can be represented in a manner of, but not limited to, a Histogram, the re-focusing capability range information can be represented in a manner of, but not limited to, a colored tape, in one optional application scene, if the user wants to perform collection parameter adjustment, the center of the Histogram of the distribution information can be adjusted to be within the re-focusing capability range, to cause a light field image subsequently collected to have a certain re-focusing range, or the center of the Histogram of the distribution information can be adjusted to a position aligned with reference points symmetrically distributed with re-focusing points in the re-focusing capability range, to allow a certain re-focusing range at a shallower depth or a deeper depth of the current focusing point, and so on. The solution can intuitively present the corresponding relationship between the distribution information and the re-focusing capability range, thus make it more convenient for the user to adjust distribution of the to-be-collected light field images within the re-focusing capability range according to their actual needs, simplifying adjustment of light field collection parameters and improving user experience.

After the re-focusing capability range of the light field camera is acquired, the light field collection control method may further comprise: acquiring expected focusing depth range information of the scene; and performing focusing processing on the light field camera according to re-focusing capability information and the expected focusing depth range information. If a focusing point selected during light field collection is located within the re-focusing capability range of the light field camera, light field images collected based on the light field camera can acquire one or more re-focusing images within a certain re-focusing range, and the re-focusing range may be the re-focusing capability range itself or may be one sub-range within the re-focusing capability range. The solution can acquire expected focusing depth range information of the scene, and the expected focusing depth range information usually represents a depth range of a re-focusing image the scene that a user or device can acquire. If the re-focusing capability range and the expected focusing depth range of the light field camera do not overlap at all, the probability of the light field images collected acquiring re-focusing images decreases or even re-focusing images cannot be acquired. It can be known according to the formula (7) that the first distance between the main lens and the sub-lens array can be changed through focusing processing, and the re-focusing capability range of the light field camera can be changed. The solution causes the re-focusing capability range and the expected focusing depth range of the light field camera to partially overlap or even completely overlap through focusing processing, that is, causing the re-focusing capability range of the light field camera to completely cover or partially cover the expected focusing depth range, in this way, a light field image collected based on the light field camera after focusing adjustment has a certain re-focusing range, at least one re-focusing image within the re-focusing range can be acquired based on the light field image, and the re-focusing range and the expected focusing depth range may be set to be as close as possible, which can better meet users' diversified demands.

The manner of acquiring the expected focusing depth range information is very flexible, which is not limited by the embodiments of the present application, for example, the acquiring expected focusing depth range information comprises: acquiring at least two expected focusing points with different depths via the preview image; and determining the expected focusing depth range information according to the at least two expected focusing points with different depths. This solution can acquire two or more expected focusing points with different depths based on the preview image, a depth range comprised in the expected focusing points may serve as the expected focusing depth range, and the solution facilitates operation by the users. After the expected focusing depth range is determined, focusing processing can be performed on the light field camera, for example, the first distance between the main lens and the sub-lens array is adjusted, to cause a focusing point determined in an overlapping part of the re-focusing capability range and the expected focusing depth range of the light field camera after adjustment to serve as a focusing point of the light field camera for light field collection on the scene. The solution facilitates realization of automatic focusing processing of light field images according to user demands, improves intelligence of collection of the light field images, and simplifies users' operations.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not form any limitation on the implementation procedure of the specific implementations of the present application.

Figure 5:
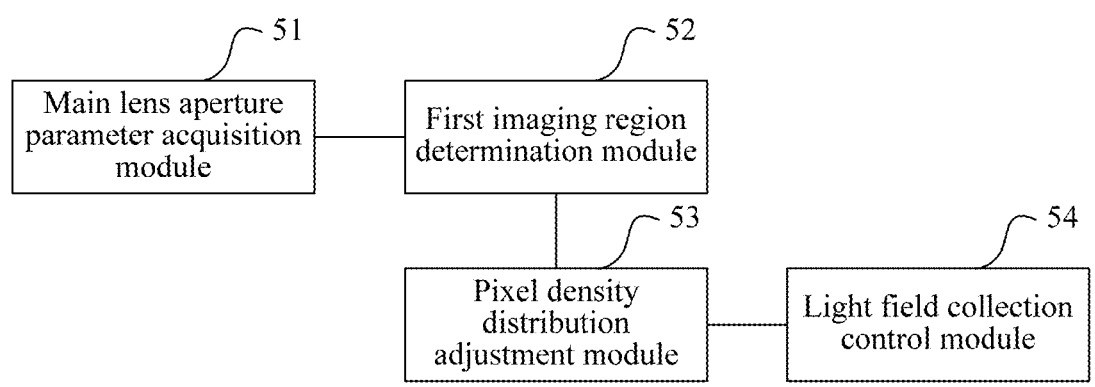
FIG. 5 is a logic block diagram of one light field collection control apparatus according to one embodiment of the present application.

FIG. 5 is a logic block diagram of one light field collection control apparatus according to one embodiment of the present application. As shown in FIG. 5, a light field collection control apparatus according to an embodiment of the present application comprises: a main lens aperture parameter acquisition module 51, a first imaging region determination module 52, a pixel density distribution adjustment module 53 and a light field collection control module 54.

The main lens aperture parameter acquisition module 51 is configured to acquire an aperture parameter of a main lens of a light field camera.

The first imaging region determination module 52 is configured to determine, according to the main lens aperture parameter, in an image sensor of the light field camera, a local part of an imaging region corresponding to at least one sub-lens in a sub-lens array of the light field camera as a first imaging region.

The pixel density distribution adjustment module 53 is configured to adjust pixel density distribution of the image sensor, to cause pixel density of the first imaging region after adjustment to be distinguished from that of other parts of the imaging region.

The light field collection control module 54 is configured to perform light field collection on a scene via the adjusted light field camera.

The technical solution according to the embodiment of the present application determines, according to an aperture parameter of a main lens of a light field camera, in an image sensor of the light field camera, a local part of an imaging region corresponding to at least one sub-lens in a sub-lens array of the light field camera as a first imaging region, adjusts pixel density distribution of the image sensor, to cause pixel density of the first imaging region after adjustment to be distinguished from that of other parts of the imaging region, and performs light field collection on a scene via the adjusted light field camera, to cause pixel density of an image sensor of an effective imaging region corresponding to the aperture parameter of the main lens to be higher, thereby improving utilization of image sensor pixels in a process of performing light field collection on a scene based on a light field camera and improving imaging quality of light field images.

Device manifestations of the light field collection control apparatus are not limited, for example, the light field collection control apparatus may be a certain separate component, and the component cooperates with the light field camera through communications; or the light field collection control apparatus may be integrated, as a certain functional module, into an image collection device comprising a light field camera, which is not limited by the embodiments of the present application.

Figure 6:
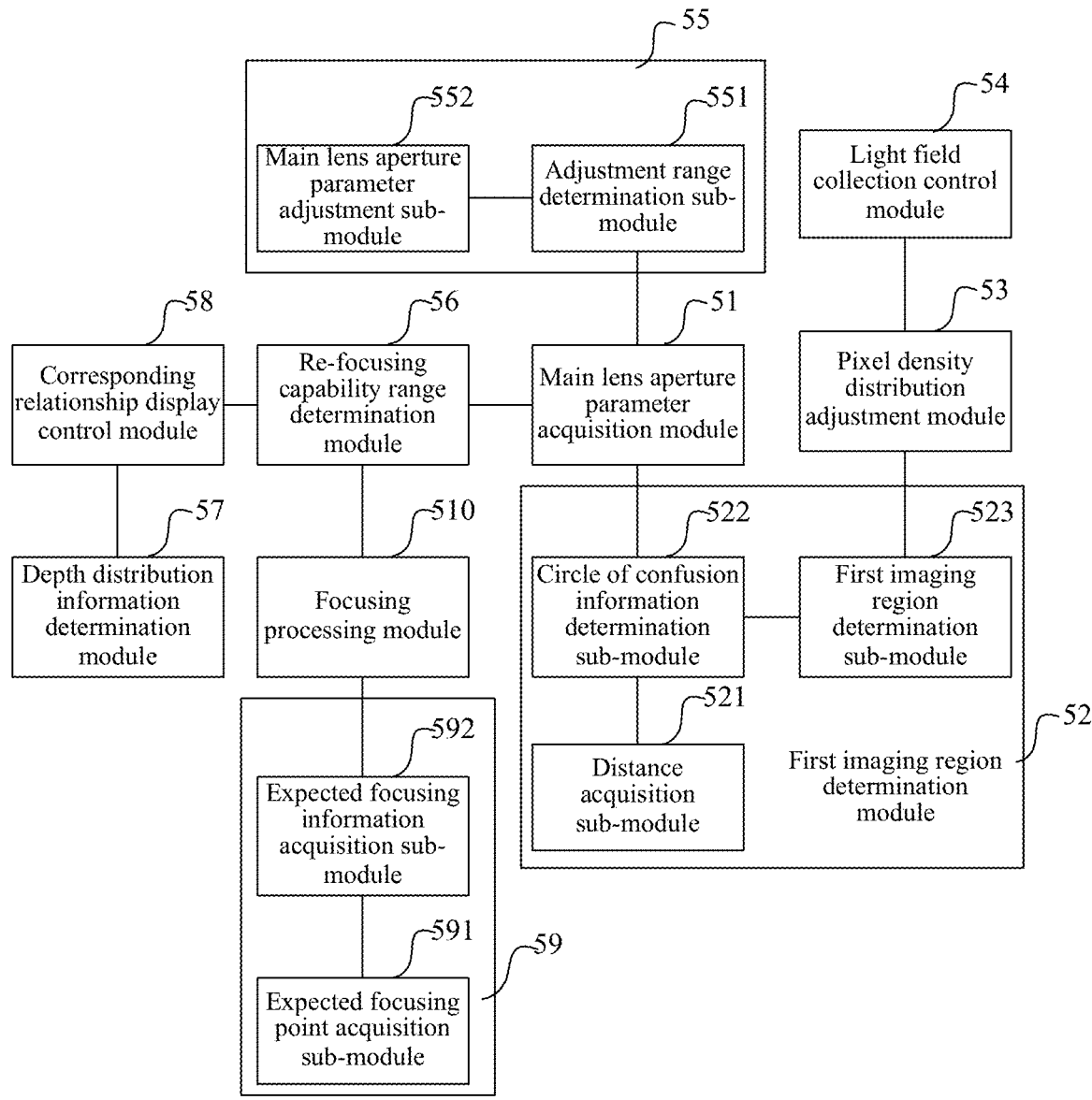
FIG. 6 is a logic block diagram of another light field collection control apparatus according to one embodiment of the present application.

Optionally, as shown in FIG. 6, the light field collection control apparatus may further comprise: a main lens aperture parameter adjustment module 55. The main lens aperture parameter adjustment module 55 is configured to adjust the aperture parameter of the main lens. The technical solution according to an embodiment of the present application provides a solution for balancing effective image sensor utilization and adjustable aperture, broadens the application range of the light field camera, and improves convenience to the users.

Optionally, the main lens aperture parameter adjustment module 55 comprises: an adjustment range determination sub-module 551 and a main lens aperture parameter adjustment sub-module 552. The adjustment range determination sub-module 551 is configured to determine a main lens aperture parameter adjustment range according to sub-lens aperture parameters of the light field camera; and the main lens aperture parameter adjustment sub-module 552 is configured to adjust the aperture parameter of the main lens according to the main lens aperture parameter adjustment range. The solution is adopted to adjust the aperture of the main lens, which helps to avoid or reduce the probability that the same image sensor pixel point records light field information of different object points of the scene possibly caused by adjustment of pixel density of the image sensor, thereby reducing computing complexity of post-processing based on the light field image.

Optionally, the first imaging region determination module 52 comprises: a distance acquisition sub-module 521, a circle of confusion information determination sub-module 522 and a first imaging region determination sub-module 523. The distance acquisition sub-module 521 is configured to acquire a first distance between the main lens and the sub-lens array and a second distance between the sub-lens array and the image sensor; the circle of confusion information determination sub-module 522 is configured to determine imaging region circle of confusion information according to the aperture parameter of the main lens, the first distance and the second distance; and the first imaging region determination sub-module 523 is configured to determine a local part corresponding to the imaging region circle of confusion information in the imaging region corresponding to the at least one sub-lens as the first imaging region. It is feasible to use the solution to determine a first imaging region of an imaging region corresponding to one sub-lens in the sub-lens array, or determine a first imaging region of each imaging region in various imaging regions corresponding to the sub-lenses in the sub-lens array, or determine a first imaging region of each imaging region in various imaging regions corresponding to some sub-lenses in the sub-lens array, and so on; the implementation is simple and flexible.

Optionally, the light field collection control apparatus further comprises: a re-focusing capability range determination module 56. The re-focusing capability range determination module 56 is configured to determine a re-focusing capability range of the light field camera according to the aperture parameter of the main lens. Use of the solution can acquire a re-focusing capability range of the light field camera corresponding to the current main lens aperture parameter of the light field camera, and the solution is simple and easy to implement.

Optionally, the light field collection control apparatus further comprises: a depth distribution information determination module 57 and a corresponding relationship display control module 58. The depth distribution information determination module 57 is configured to acquire distribution information of the pixel points of a preview image of the scene in a depth direction; and the corresponding relationship display control module 58 is configured to display a corresponding relationship between the distribution information and the re-focusing capability range. The solution can intuitively present the corresponding relationship between the distribution information and the re-focusing capability range, thus making it easier for the user to adjust distribution of light field images to be collected within the re-focusing capability range according to actual requirements, simplifying the operation of adjusting light field collection parameters and improving user experience.

Optionally, the light field collection control apparatus further comprises: an expected focusing information acquisition module 59 and a focusing processing module 510. The expected focusing information acquisition module 59 is configured to acquire expected focusing depth range information of the scene; and the focusing processing module 510 is configured to perform focusing processing on the light field camera according to re-focusing capability information and the expected focusing depth range information. The solution causes the re-focusing capability range and the expected focusing depth range of the light field camera to partially overlap or even completely overlap through focusing processing, that is, causing the re-focusing capability range of the light field camera to completely cover or partially cover the expected focusing depth range, in this way, a light field image collected based on the light field camera after focusing adjustment has a certain re-focusing range, at least one re-focusing image within the re-focusing range can be acquired based on the light field image, and the re-focusing range and the expected focusing depth range may be set to be as close as possible, which can thus better meet users' diversified actual application demands.

Optionally, the expected focusing information acquisition module 59 comprises: an expected focusing point acquisition sub-module 591 and an expected focusing information acquisition sub-module 592. The expected focusing point acquisition sub-module 591 is configured to acquire at least two expected focusing points with different depths via the preview image; and the expected focusing information acquisition sub-module 592 is configured to determine the expected focusing depth range information according to the at least two expected focusing points with different depths. The solution facilitates realization of automatic focusing processing of light field images according to user demands, improves intelligence of collection of the light field images, and simplifies users' operations.

Figure 7:
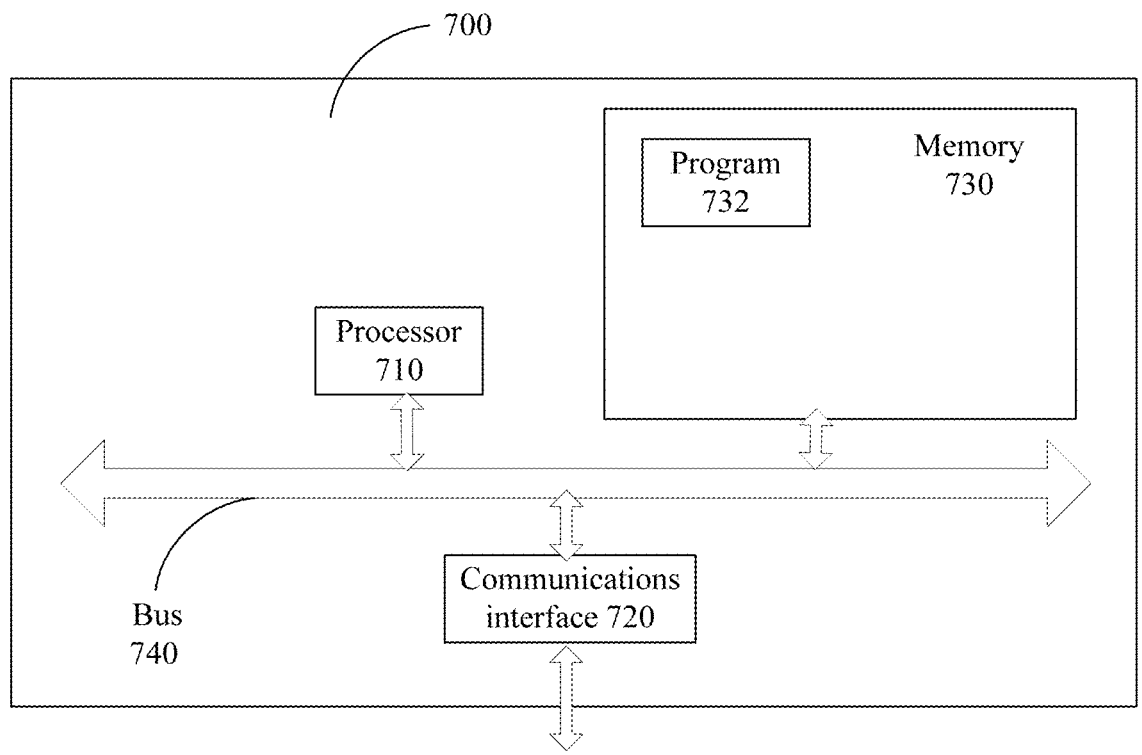
FIG. 7 is a logic block diagram of a further light field collection control apparatus according to one embodiment of the present application.

FIG. 7 is a logic block diagram of a further light field collection control apparatus according to one embodiment of the present application, and the specific embodiments of the present application do not limit a specific implementation of the light field collection control apparatus 700. As shown in FIG. 7, the light field collection control apparatus 700 may comprise:

a processor 710, a Communications Interface 720, a memory 730, and a communications bus 740.

The processor 710, the Communications Interface 720, and the memory 730 accomplish mutual communications via the communications bus 740.

The Communications Interface 720 is configured to communicate with, for example, devices or external light sources with a communications function.

The processor 710 is configured to execute a program 732, and specifically, can implement relevant steps in an embodiment of the light field collection control method.

For example, the program 732 may comprise a program code, the program code comprising computer operation instructions.

The processor 710 may be a central processing unit (CPU), or an application specific integrated circuit (ASIC), or be configured to be one or more integrated circuits which implement the embodiments of the present application.

The memory 730 is configured to store the program 732. The memory 730 may comprise a high-speed RAM memory, and may also comprise a non-volatile memory, for example, at least one magnetic disk memory.

For example, in one optional implementation, the processor 710 may perform the following steps by executing the program 732: acquiring an aperture parameter of a main lens of a light field camera; determining, according to the main lens aperture parameter, in an image sensor of the light field camera, a local part of an imaging region corresponding to at least one sub-lens in a sub-lens array of the light field camera as a first imaging region; adjusting pixel density distribution of the image sensor, to cause pixel density of the first imaging region after adjustment to be distinguished from that of other parts of the imaging region; and performing light field collection on a scene via the adjusted light field camera.

In other optional implementations, the processor 710 may further perform the steps mentioned in the any other embodiments by executing the program 732, which is not repeated herein.

Reference can be made to corresponding description in the corresponding steps, modules, sub-modules and units in the embodiments for specific implementation of the steps in the program 732, which is not repeated herein. Those skilled in the art can clearly understand that, reference can be made to the corresponding process description in the method embodiments for the devices described above and the specific working procedures of the modules, which will not be repeated herein in order to make the description coherent and concise.

Figure 8:
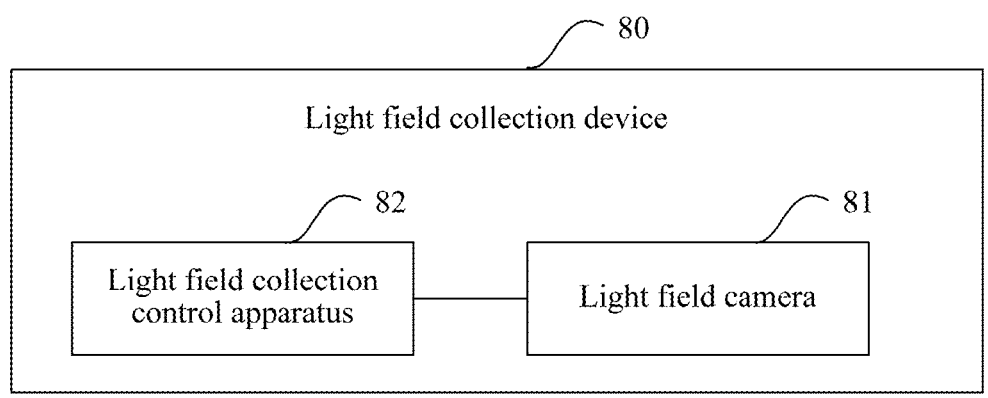
FIG. 8 is a logic block diagram of a light field collection device according to one embodiment of the present application.

FIG. 8 is a logic block diagram of a light field collection device according to one embodiment of the present application. As shown in FIG. 8, a light field collection device 80 according to the embodiment of the present application comprises a light field camera 81 and a light field collection control apparatus 82, and the light field collection control apparatus 82 is connected with the light field collection device 80. Reference can be made to the description in the corresponding embodiments above for the structure and the working principle of the light field collection control apparatus 82, which is not repeated herein. The light field camera may comprise, but is not limited to: devices with phototaking, filming, photographing, video monitoring and other light field collection functions, for example, it may be, but is not limited to, the following device types: a camera, a mobile phone, a webcam, a video camera, a video tape recorder and the like.

The technical solution according to an embodiment of the present application determines, according to an aperture parameter of a main lens of a light field camera, in an image sensor of the light field camera, a local part of an imaging region corresponding to at least one sub-lens in a sub-lens array of the light field camera as a first imaging region, adjusts pixel density distribution of the image sensor, to cause pixel density of the first imaging region after adjustment to be distinguished from that of other parts of the imaging region, and performs light field collection on a scene via the adjusted light field camera, to cause pixel density of an image sensor of an effective imaging region corresponding to the aperture parameter of the main lens to be higher, thereby improving utilization of image sensor pixels in a process of performing light field collection on a scene based on a light field camera and improving imaging quality of light field images.

Optionally, the image sensor may be the flexible image sensor as stated above. Alternatively, the image sensor may further comprise: multiple image sensor pixels array-distributed; and a controlled deformable material portion, respectively connected with the multiple image sensor pixels; wherein the controlled deformable material portion can deform under the force of an external field, and density distribution of the multiple image sensor pixels is correspondingly adjusted through the deformation; the external field is controlled by the imaging control apparatus, and the imaging control apparatus may directly control the external field to control the deformation of the controlled deformable material portion, thereby radially adjusting pixel density distribution of the image sensor; or, the imaging control apparatus can indirectly control the external field by controlling the deformation control portion, to cause the controlled deformable material portion to produce corresponding deformation to radially adjust pixel density distribution of the image sensor; and so on. Deformation of the controlled deformable material portion can be performed by changing a certain external effect factor (such as an external field) acting on the controlled deformable material portion, and when the external field acting thereon is removed or changed, the deformation of the controlled deformable material portion can be restored; the controlled deformable material portion may be made from one or more of the controlled deformable materials such as piezoelectric materials, electroactive polymers, photodeformation materials and magnetostriction materials; according to different controlled deformable materials include in the controlled deformable material portion, it can be determined which corresponding external field may be used to control the controlled deformable material portion, for example, the external field may be, but is not limited to, an electric field, a magnetic field, a light field and the like. A manner in which the image sensor pixels and the deformed material portion are physically connected can be determined according to actual needs, as long as the manner can meet the requirement that pixel density distribution of the image sensor can be adjusted when the deformed material portion produces deformation, which is not limited by the embodiments of the present application, and reference can be made to FIG. 3, FIG. 4 and the corresponding description above for structure examples of optional light paths of the light field camera, which are not repeated herein.

In the various embodiments of the present application, the serial numbers and/or sequence numbers of the foregoing embodiments are merely for the convenience of description, and do not imply the preference among the embodiments. Particular emphasis is put on the description about each embodiment, and reference can be made to relevant description of other embodiments for the content not presented in detail in a certain embodiment. Reference can be made to the description about the corresponding method embodiments for related description about the implementation principle or process of relevant apparatus, device or system embodiments, which is not repeated herein.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), a magnetic disk, an optical disk or any other mediums that can store program codes.

In the embodiments of the apparatuses, methods and systems of the present application, it is apparent that the members (systems, sub-systems, modules, sub-modules, units, sub-units, and the like) or the steps can be decomposed, combined and/or recombined after decomposition. The decomposition and/or recombination should be regarded as equivalent solutions of the present application. Moreover, in the description about the embodiments of the present application, features described and/or illustrated with respect to one implementation may be used in one or more other implementations in the same or a similar manner, be combined with features in other implementations, or replace the features in other implementations.

It should be emphasized that, the term "comprise" used herein refers to existence of features, elements, steps or components, but does not exclude existence or addition of one or more other features, elements, steps or components.

Finally, it should be noted that, the above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A light field collection control method, comprising:
   acquiring an aperture parameter of a main lens of a light field camera;
   determining, according to the main lens aperture parameter, in an image sensor of the light field camera, a local part of an imaging region corresponding to at least one sub-lens in a sub-lens array of the light field camera as a first imaging region;
   adjusting pixel density distribution of the image sensor, to cause pixel density of the first imaging region after adjustment to be distinguished from that of other parts of the imaging region, wherein:
      when the first imaging region participates in light field collection, average pixel density of the first imaging region is greater than average pixel density of other parts of the imaging region; and
      when the first imaging region does not participate in the light field collection, the average pixel density of the first imaging region is smaller than the average pixel density of a part of the imaging region participating in the light field collection; and
   performing the light field collection on a scene via the adjusted light field camera.

2. The method of claim 1, before the acquiring an aperture parameter of a main lens, further comprising:
   adjusting the aperture parameter of the main lens.

3. The method of claim 2, wherein the adjusting the aperture parameter of the main lens comprises:
   determining a main lens aperture parameter adjustment range according to sub-lens aperture parameters of the light field camera; and
   adjusting the aperture parameter of the main lens according to the main lens aperture parameter adjustment range.

4. The method of claim 1, wherein the determining a first imaging region comprises:
   acquiring a first distance between the main lens and the sub-lens array and a second distance between the sub-lens array and the image sensor;
   determining imaging region circle of confusion information according to the aperture parameter of the main lens, the first distance and the second distance; and
   determining a local part corresponding to the imaging region circle of confusion information in the imaging region corresponding to the at least one sub-lens as the first imaging region.

5. The method of claim 1, further comprising: determining a re-focusing capability range of the light field camera according to the aperture parameter of the main lens.

6. The method of claim 5, after acquisition of the re-focusing capability range, further comprising:
   acquiring distribution information of a pixel point of a preview image of the scene in a depth direction; and
   displaying a corresponding relationship between the distribution information and the re-focusing capability range.

7. The method of claim 5, after acquisition of the re-focusing capability range, further comprising:
   acquiring expected focusing depth range information of the scene; and
   performing focusing processing on the light field camera according to re-focusing capability information and the expected focusing depth range information.

8. The method of claim 7, wherein the acquiring expected focusing depth range information comprises:
   acquiring at least two expected focusing points with different depths via the preview image; and
   determining the expected focusing depth range information according to the at least two expected focusing points with different depths.

9. A light field collection control apparatus, characterized by comprising a processor and a memory, the memory storing computer executable instructions that, in response to execution, cause the apparatus to perform operations, comprising:
   acquiring an aperture parameter of a main lens of a light field camera;
   determining, according to the main lens aperture parameter, in an image sensor of the light field camera, a local part of an imaging region corresponding to at least one sub-lens in a sub-lens array of the light field camera as a first imaging region;
   adjusting pixel density distribution of the image sensor, to cause pixel density of the first imaging region after adjustment to be distinguished from that of other parts of the imaging region, wherein:
      when the first imaging region participates in light field collection, average pixel density of the first imaging region is greater than average pixel density of other parts of the imaging region; and
      when the first imaging region does not participate in the light field collection, the average pixel density of the first imaging region is smaller than the average pixel density of a part of the imaging region participating in the light field collection; and performing the light field collection on a scene via the adjusted light field camera.

10. The apparatus of claim 9, wherein the operations further comprise:
before the acquiring an aperture parameter of a main lens, adjusting the aperture parameter of the main lens.

11. The apparatus of claim 10, wherein the operations further comprise:
determining a main lens aperture parameter adjustment range according to sub-lens aperture parameters of the light field camera; and
adjusting the aperture parameter of the main lens according to the main lens aperture parameter adjustment range.

12. The apparatus of claim 9, wherein the operations further comprise:
acquiring a first distance between the main lens and the sub-lens array and a second distance between the sub-lens array and the image sensor;
determining imaging region circle of confusion information according to the aperture parameter of the main lens, the first distance and the second distance; and
determining a local part corresponding to the imaging region circle of confusion information in the imaging region corresponding to the at least one sub-lens as the first imaging region.

13. The apparatus of claim 9, wherein the operations further comprise:
determining a re-focusing capability range of the light field camera according to the aperture parameter of the main lens.

14. The apparatus of claim 13, wherein the operations further comprise:
acquiring distribution information of a pixel point of a preview image of the scene in a depth direction; and
displaying a corresponding relationship between the distribution information and the re-focusing capability range.

15. The apparatus of claim 13, wherein the operations further comprise:
acquiring expected focusing depth range information of the scene; and
performing focusing processing on the light field camera according to re-focusing capability information and the expected focusing depth range information.

16. The apparatus of claim 15, wherein the operations further comprise:
acquiring at least two expected focusing points with different depths via the preview image; and
determining the expected focusing depth range information according to the at least two expected focusing points with different depths.

17. A light field collection device, comprising a light field camera and the light field collection control apparatus of claim 9, the light field collection control apparatus being connected with the light field camera.

18. A non-transitory computer-readable medium comprising a set of executable instructions, which, in response to execution, cause one or more processors to perform the operations, comprising:
acquiring an aperture parameter of a main lens of a light field camera;
determining, according to the main lens aperture parameter, in an image sensor of the light field camera, a local part of an imaging region corresponding to at least one sub-lens in a sub-lens array of the light field camera as a first imaging region;
adjusting pixel density distribution of the image sensor, to cause pixel density of the first imaging region after adjustment to be distinguished from that of other parts of the imaging region, wherein:
when the first imaging region participates in light field collection, average pixel density of the first imaging region is greater than average pixel density of other parts of the imaging region; and
when the first imaging region does not participate in the light field collection, the average pixel density of the first imaging region is smaller than the average pixel density of a part of the imaging region participating in the light field collection; and
performing the light field collection on a scene via the adjusted light field camera.

* * * * *